(12) United States Patent
Goubault et al.

(10) Patent No.: US 8,342,114 B2
(45) Date of Patent: Jan. 1, 2013

(54) SHIP HULL COMPRISING AT LEAST ONE FLOAT

(75) Inventors: Philippe Goubault, Lorient (FR); Benoit Fumery, Queven (FR)

(73) Assignee: DCNS, Paris (FR)

( * ) Notice: Subject to any disclaimer, the term of this patent is extended or adjusted under 35 U.S.C. 154(b) by 814 days.

(21) Appl. No.: 11/995,823

(22) PCT Filed: Aug. 8, 2006

(86) PCT No.: PCT/FR2006/001926
§ 371 (c)(1),
(2), (4) Date: Jan. 16, 2008

(87) PCT Pub. No.: WO2007/023215
PCT Pub. Date: Mar. 1, 2007

(65) Prior Publication Data
US 2008/0210149 A1    Sep. 4, 2008

(30) Foreign Application Priority Data
Aug. 26, 2005    (FR) ..................... 05 08788

(51) Int. Cl.
*B63B 1/00*    (2006.01)

(52) U.S. Cl. .................... 114/56.1

(58) Field of Classification Search ............ 114/274, 114/288, 61.1, 61.29, 56.1; 440/79
See application file for complete search history.

(56) References Cited

U.S. PATENT DOCUMENTS

| | | | | |
|---|---|---|---|---|
| 2,666,406 A | * | 1/1954 | Babcock | 114/288 |
| 5,628,273 A | * | 5/1997 | Crouse, II | 114/343 |
| 5,713,772 A | * | 2/1998 | Takahashi et al. | 440/78 |
| 5,937,777 A | | 8/1999 | Azima | |
| 6,176,196 B1 | * | 1/2001 | Halter | 114/271 |
| 6,708,642 B1 | | 3/2004 | Taylor | |
| 2005/0126464 A1 | | 6/2005 | Lang et al. | |

FOREIGN PATENT DOCUMENTS

| | | | |
|---|---|---|---|
| JP | 59160684 A | * | 9/1984 |
| JP | 61-46786 A | | 3/1986 |

OTHER PUBLICATIONS

Brian Trenhaile, "Understanding Ship and Boat Trim (Stability & Trim—Part 2)", Hawaii Marine Templates, 2004, retrieved from the Internet on Mar. 24, 2010, http://www.hawaii-marine.com/templates/Trim_Article.htm.

* cited by examiner

*Primary Examiner* — Daniel Venne
(74) *Attorney, Agent, or Firm* — Young & Thompson (57) ABSTRACT

A ship hull includes at least one float (10) and a center of buoyancy (CB) situated behind the center of flotation. (CF), the distance between the center of buoyancy and center of flotation is greater by 5% than the waterline length L of the hull.

2 Claims, 11 Drawing Sheets

SHIP HULL COMPRISING AT LEAST ONE FLOAT

BACKGROUND OF THE INVENTION

The present invention relates to a ship hull comprising at least one float.

A ship hull is characterized, in particular, by its center of flotation which is the centroid of its waterplane, where the waterplane is the area defined by the intersection of the hull of the ship and of the plane corresponding to the waterline, and by the position of its center of buoyancy which is the centroid of the immersed volume of the hull, i.e., the volume of the hull that lies below the waterplane. The seaworthiness of a ship is, in particular, related to the relative positions of its center of flotation and of its center of buoyancy.

DESCRIPTION OF THE RELATED ART

In a ship, in general, the center of flotation and the center of buoyancy are substantially in vertical alignment with each other. More precisely, and in order to define the characteristics of a ship hull, consideration is given firstly to the longitudinal center of flotation (LCF), which is the distance from the stern end of the waterplane to the center of flotation, and secondly to the longitudinal center of buoyancy (LCB), which is the distance from the stern end of the waterplane to the center of buoyancy.

Most of the existing ships are designed in a manner such that the ratio of LCF to LCB lies in the range 0.85 to 1, certain ships exceptionally reaching a ratio of 1.05.

Such a ship hull design offers the advantage of enabling the ships to carry heavy loads, but suffers from the drawback of resulting in the ships having low pitch stiffness, i.e., in them being very sensitive to head-swell.

In order to remedy that drawback and in order to obtain a ship that has good pitch stiffness, it has been proposed to make hulls in which the center of buoyancy is moved forward towards the bow of the ship, and the center of flotation is moved significantly aft towards the stern. Hulls are thus obtained in which the LCB-to-LCF ratio is about 0.7. These hull characteristics are obtained with an immersed hull fairing that is constituted in particular by a very large bulb at the bow end, and with a stern portion of the waterplane that is relatively broad while the bow portion of the waterplane is a tapering portion. Such ships offer the advantage of having very good pitch stiffness, but suffer from the drawback of not being capable of carrying very heavy loads. The zones of the ship that are in register with the immersed masses or volumes that are largest are in the tapering bow portions of the ship, thereby leaving little space for accommodating installations on the ship.

SUMMARY OF THE INVENTION

An object of the present invention is to remedy those drawbacks by proposing a ship that has very good pitch stiffness while also offering extensive possibilities for accommodating superstructures.

To this end, the present invention provides a ship hull comprising at least one float, and in which the center of buoyancy is aft of the center of flotation of the hull, and the distance between the center of buoyancy and the center of flotation is greater than 0.05 times the length of the waterline of the hull, the length of the waterline being the total length of the waterplane. For such a float, the ratio between the longitudinal center of flotation and the longitudinal center of buoyancy can exceed 1.1.

In particular embodiments, the hull can have one or more of the following characteristics:
  the center of buoyancy of the hull is situated in register with the stern half of the waterplane of the hull, and the center of flotation of the hull is situated in the bow half of the waterplane;
  the hull comprises at least one main float whose waterplane has a wide bow portion and a tapering stern portion so that the corresponding center of flotation is situated in the bow half of the waterplane, and whose immersed portion has a tapering bow and at least one stern bulb, so that the center of buoyancy of the main float is situated in register with the stern half of the waterplane;
  the immersed portion of at least one main float includes two stern bulbs that are mutually parallel;
  the hull comprises two mutually parallel main floats;
  the hull further comprises at least two side stabilizer floats;
  each side float includes an immersed portion that is situated in the stern half of the ship;
  each side float includes a keel that extends towards the bow of the hull above the waterline, over at least two-thirds of the length of the hull, and the length of the immersed portion of the side float is less than one half of the total length of the side float;
  at least one side float further includes a foil;
  the hull has outer side walls in which at least those portions that are situated above the water line are inclined inwards so that their outside surfaces face upwards, the angle of inclination of said walls relative to the vertical being greater than 20°; and
  the hull is made of composite materials.

The present invention also provides a ship that includes the inventive hull. The ship can have one or more of the following characteristics:
  its hull comprises at least one main float provided with at least one stern bulb whose stern end carries at least one propulsion means;
  the ship includes at least two propulsion means constituted by two contra-rotating propellers;
  the ship has at least two floats that are mutually parallel and that define a tunnel, and it includes at least one energy generation means that gives off an exhaust gas which is discharged into the tunnel defined by the two floats, and which is at least partially confined in said tunnel by at least one curtain of water;
  the ship includes superstructures having walls that are inclined inwards so that their outside faces face upwards, at an angle relative to the vertical that is greater than 30°;
  all of the items of equipment that are designed to be used above the waterline can be concealed below the surface of the superstructures;
  the ship includes means for generating a mist of water enveloping its superstructures;
  the ship includes at least one side float, at least a portion of which constitutes a ballast compartment; and
  the ship is for naval use.

BRIEF DESCRIPTION OF THE DRAWINGS

The invention is described more precisely but non-limitingly below with reference to the accompanying figures, in which.

DESCRIPTION OF THE PREFERRED EMBODIMENTS

Figure 1:
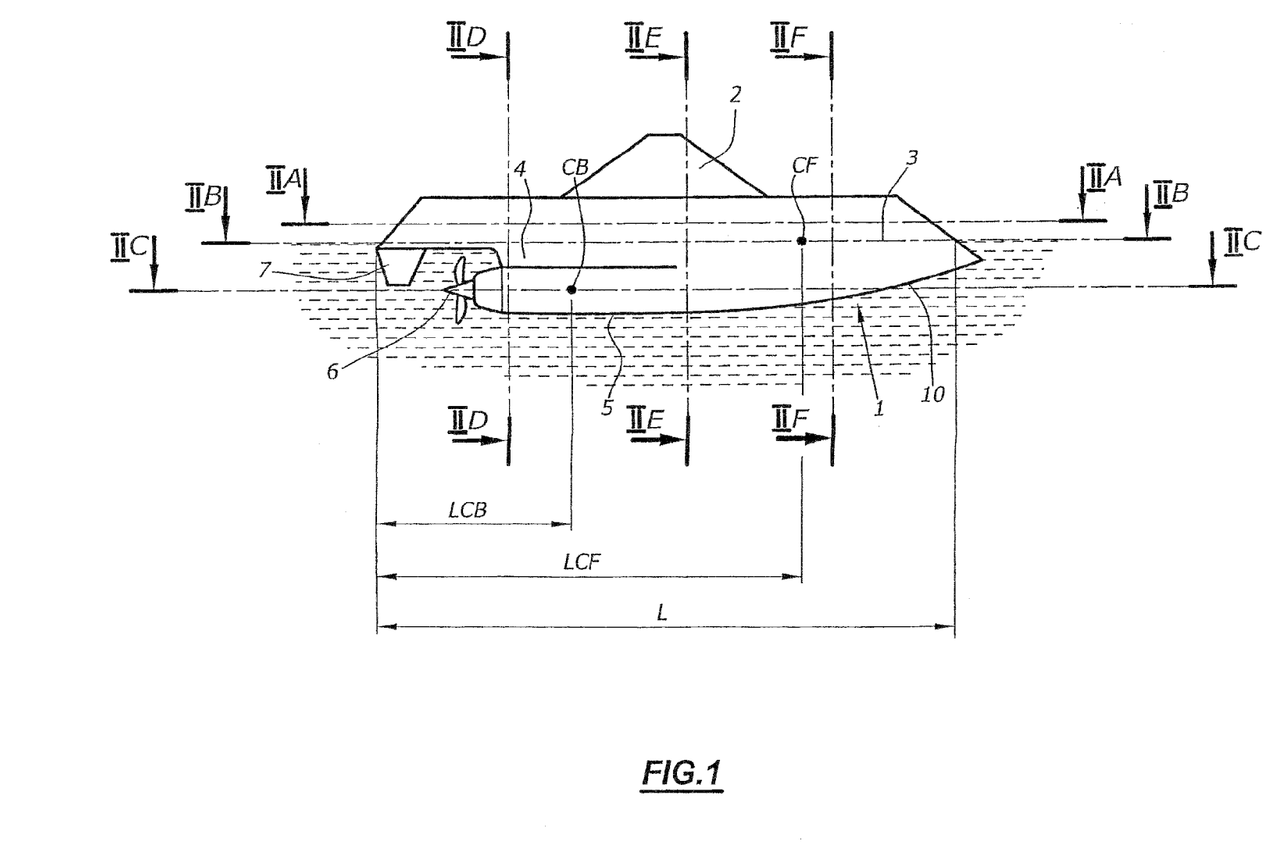
FIG. 1 is a diagrammatic profile view of a ship whose hull has very good pitch stiffness.

The single-hull ship shown diagrammatically in FIG. 1 comprises a hull 1 and superstructures 2. The hull 1, which constitutes a main float 10, has a tapering bow 3 and, below the waterline (represented by the plane BB), has a bulb 5 extending sternwards and connected to the upper portion of the hull via a web 4 that constitutes a keel. On its stern portion, the bulb 5 carries a propulsion screw or propeller 6, and the stern of the hull carries a rudder blade 7.

Figure 2A:
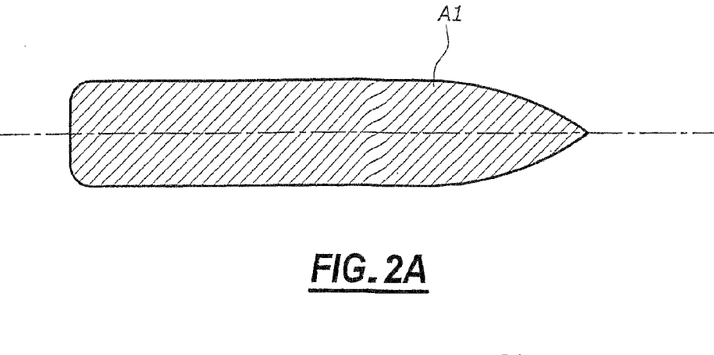
FIGS. 2A, 2B, and 2C are section views of the ship of FIG. 1 on the horizontal planes IIA, IIB, and IIC.
Figure 2B:
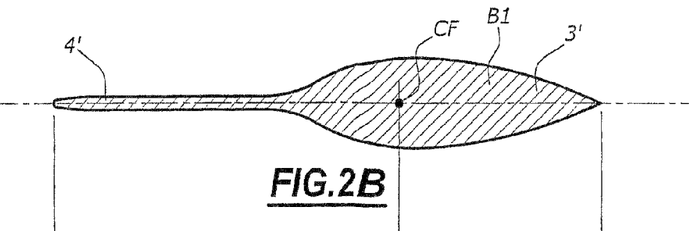

As can be seen in FIG. 2B, the section of the hull on the plane BB which, by definition, constitutes the waterplane B1 has a bulbous bow portion 3' and a link stern portion 4' that tapers to a large extent. The point CF, which is the centroid of the waterplane and which corresponds to the center of flotation, is situated in the bulbous bow portion, at a distance LCF from the stern end of the waterplane. By definition, LCF is the longitudinal center of flotation of the hull.

The total length L of the waterplane B1, also referred to as the "length of the waterline", is the length that extends from the stern tip of the tapering portion 4' to the bow tip of the bulbous portion 3' of the waterplane.

Figure 2C:
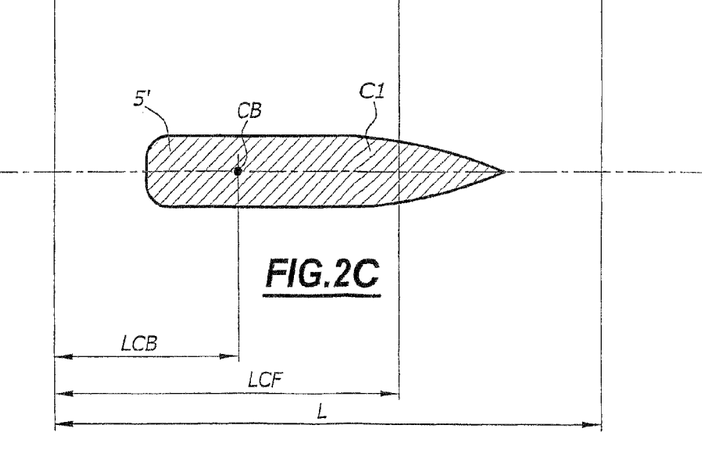

As shown in FIG. 2C, a section C1 on a plane CC situated in the lower portion of the hull and about half-way up the bulb 5, has a shape that corresponds to a relatively wide portion at its stern end and that corresponds to a tapering bow portion that tapers going towards its bow end. This figure shows the center of buoyancy CB, which corresponds to the centroid of the immersed volume of the hull, i.e., the volume of the hull of the ship that lies below the waterplane, and which is situated approximately at the stern bulb, in the stern half of the ship. The center of buoyancy CB is at a distance LCB from the stern end of the waterplane B1. By definition, LCB is the longitudinal center of buoyancy of the hull.

Finally, a section on a horizontal plane AA situated above the waterline has a shape A1 which is shown in FIG. 2A and which is a conventional ship hull shape having a tapering bow portion that tapers going towards its bow, most of the body of the hull being of substantially constant width to its stern.

As can be seen in the figure, the center of flotation is situated in the bow half of the ship, and the center of buoyancy is situated in the stern portion, and the offset between the longitudinal center of flotation and the longitudinal center of buoyancy is considerably greater than 5% of the total length L of the waterplane.

Figure 2D:
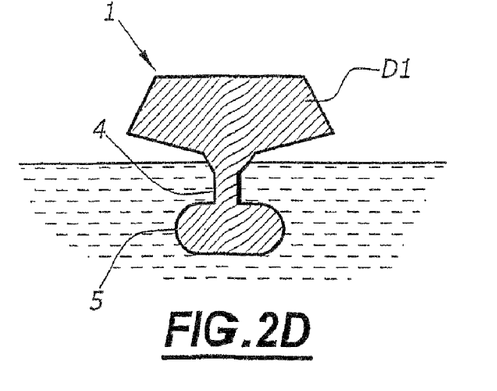
FIGS. 2D, 2E, and 2F are section views of the hull of the ship of FIG. 1 on the vertical planes IID, IIE, and IIF.
Figure 2E:
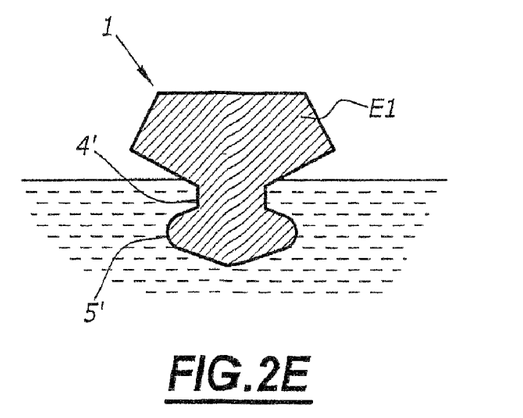
Figure 2F:
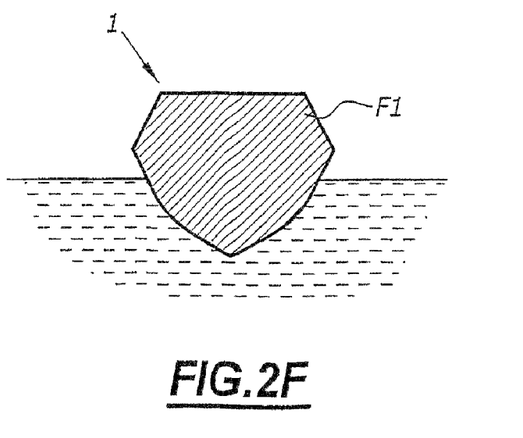

As can be seen in FIGS. 2D, 2E, and 2F, which show sections on vertical transverse planes, the stern section D1 corresponding to the section plane DD has, in its immersed portion, a bulb element 5 that is connected via a thin web or keel 4 to the upper portion of the hull.

As can be seen by means of the section E1 situated substantially mid-way along the ship, where the bow portion meets the stern portion, the bulb 5 is connected to the upper portion of the hull via a portion 4' of the keel 4 that is starting to flare.

Finally, the section F1 situated in the vicinity of the bow portion shows a conventional V-shaped immersed hull section.

With such a configuration of volumes in the hull below the waterline, the ship firstly has very high pitch stiffness. This stiffness results from the lever arm corresponding to the distance between the center of flotation and the center of buoyancy. The longer the distance between the center of floatation and the center of buoyancy, the higher the pitch stiffness of the ship, i.e., the more its trim remains horizontal when it is heading into heavy swell. With the above-described hull, the offset between the longitudinal center of flotation LCF and the longitudinal center of buoyancy LCB can be adjusted to be greater than 5% of the length L of the waterline, preferably to be greater than 15%, and better still to be greater than 20%.

In addition, because the center of buoyancy is offset towards the stern, i.e., in a zone that makes it possible to have a relatively large width of hull, the ship can have major superstructures, at least in the stern two-thirds of the hull. This characteristic represents a major difference compared with known ships having high pitch stiffness, in which ships the portion available for fitting out is the front portion since, in those ships, the center of buoyancy is situated in the bow portion. Unfortunately, the bow portion is a tapering portion. It is therefore difficult to accommodate major superstructures on such known ships.

In its waterplane, the above-mentioned single-hull ship has a relatively bulbous bow portion 3 which is necessary in order to obtain good roll stability. That can suffer from the drawback of increasing the resistance to forward motion of the ship, and therefore of requiring powerful engines or motors.

Figure 3A:
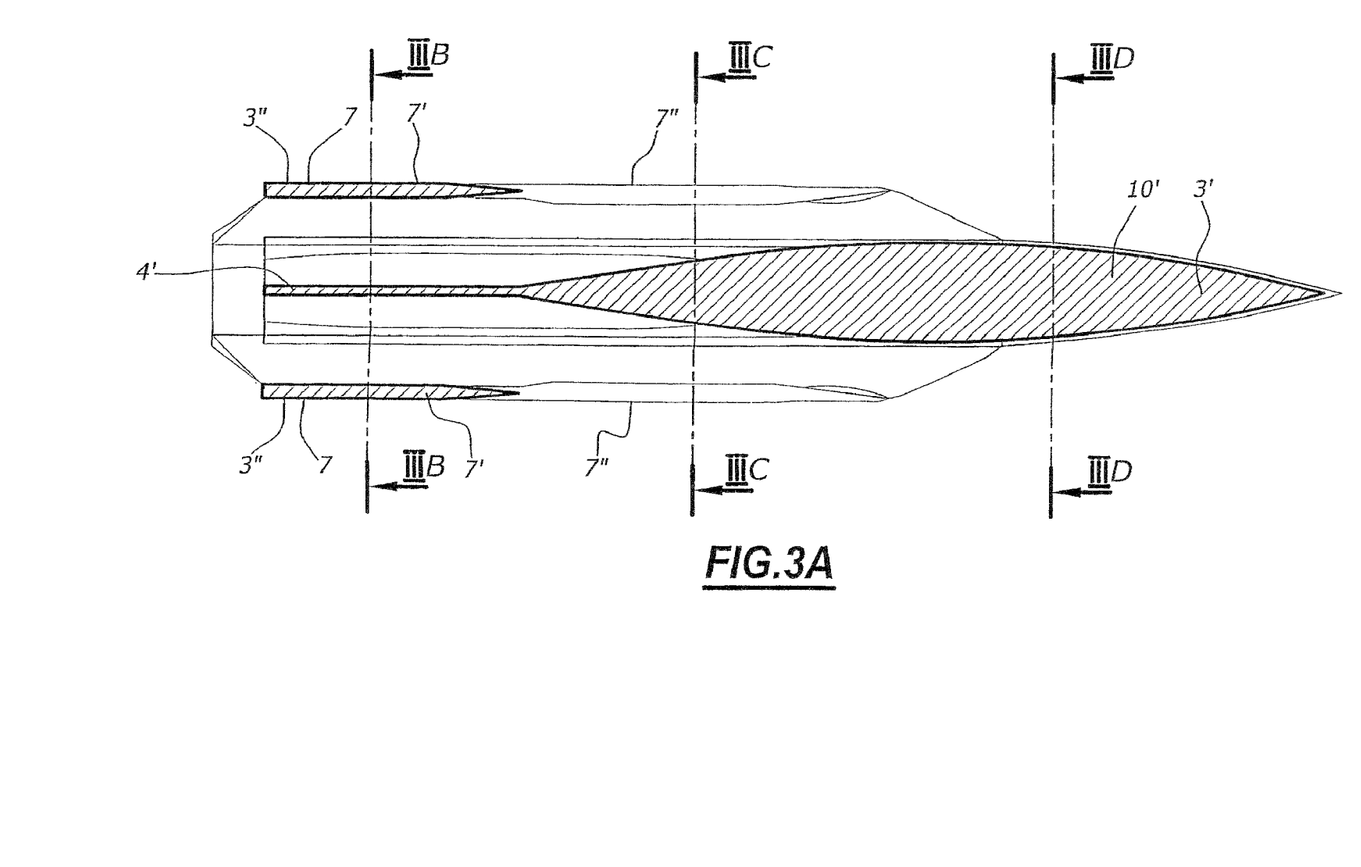
FIGS. 3A, 3B, 3C, and 3D are section views on horizontal and vertical planes of the hull of a ship of the type that is shown in FIG. 1, but that has a hull of the trimaran type.
Figure 3B:
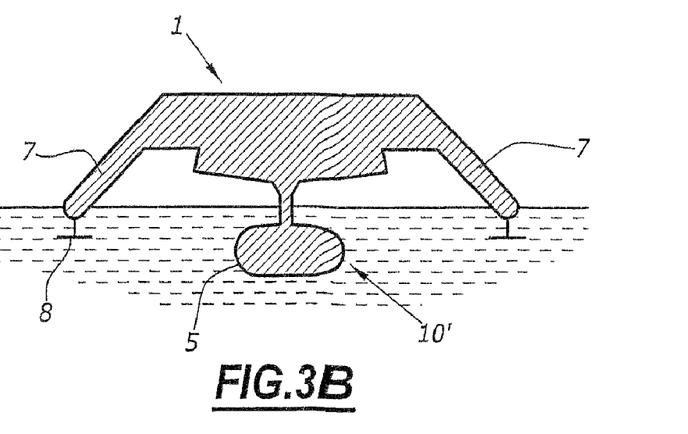
Figure 3C:
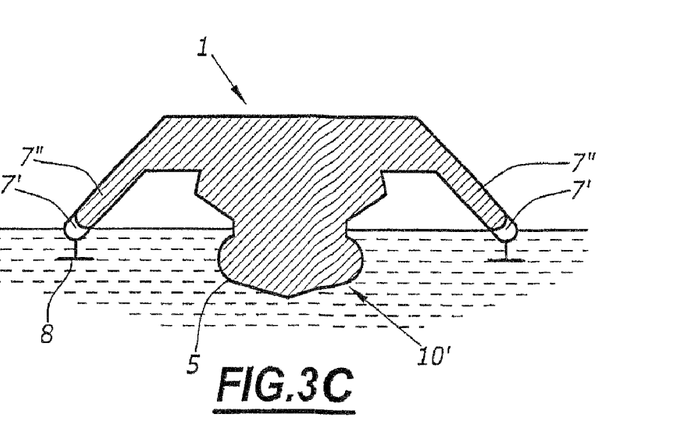
Figure 3D:
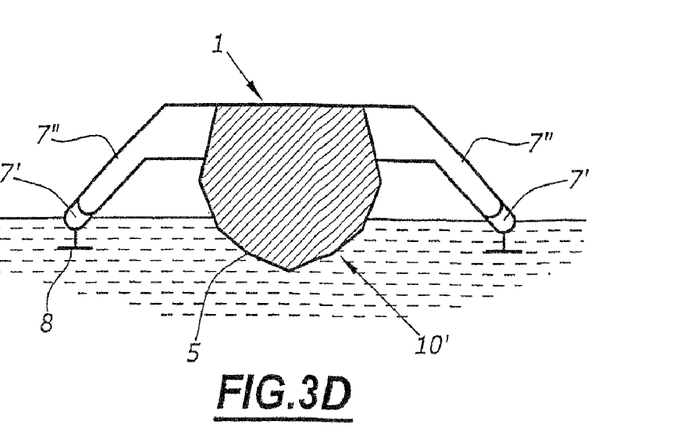

In order to improve or to reduce the resistance to forward motion of the ship, it is possible to implement a second embodiment of a hull, as shown in FIGS. 3A, 3B, 3C, and 3D. In this embodiment, the hull is of the trimaran type. It comprises a main float 10' that is similar to the main float of the preceding embodiment, that is situated along the axis of the hull, and that is supplemented on either side by side stabilizer floats 7. The waterplane has a main central portion having a bulbous bow portion 3' and a tapering stern portion 4', and two separate portions 3" corresponding to the intersections of the side stabilizer floats 7 with the waterplane. As can be seen in the figure, the bow portion 3' of the waterplane tapers to a greater extent than in the above-described embodiment. It is not necessary to have a wide waterplane in the bows in order to guarantee good roll stability for the ship because that stability is guaranteed by the side floats 7 and thus by the elements 3" of the waterplane that correspond to the intersections of said floats with the plane corresponding to the waterline. As can be seen in FIG. 3B, each of the side floats 7 mainly constitutes a keel comprising two portions. A stern portion 7' that is sufficiently deep to have its end penetrating into the water and terminating below the waterplane when the ship is in the normal position, and optionally provided with stabilizer foils 8, and a portion 7" that extends towards the bow of the ship and that has its end above the waterline so that, when the ship is properly horizontal, only the stern portions 7' of the side floats penetrate into the water and stabilize the ship, the bow portions of the keels 7" remaining above the water level. The stern portion 7' extends over approximately the stern third of the hull of the ship, whereas the keel that corresponds to each of the floats extends over approximately the stern two-thirds of the hull of the ship.

With such a hull structure, the ship can have pitch stiffness qualities, capacity to accommodate major superstructures, and roll stability, while also not having resistance to forward motion that is too high, thereby enabling it to travel at high speeds.

In the two above-described embodiments, the propulsion means 6 of the ship are situated on the stern end of the bulb 5.

Figure 4:
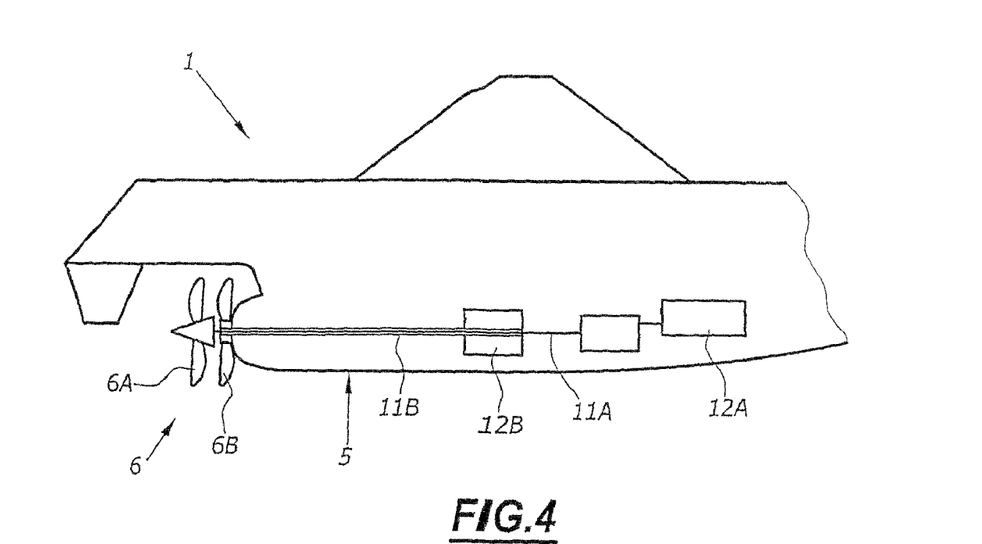
FIG. 4 is a diagrammatic view of the stern portion of the hull of a ship having a bulb, showing the propulsion means of the ship.

As shown in FIG. 4, said propulsion means, designated by overall reference 6, are situated at the end of the bulb 5, and preferably are constituted by two contra-rotating propellers 6A and 6B carried by concentric shafts 11A and 11B driven by drive means 12A and 12B that are known per se. Said drive means 12A and 12B are, for example, electric motors powered by a power source situated elsewhere in the ship.

Figure 6A:
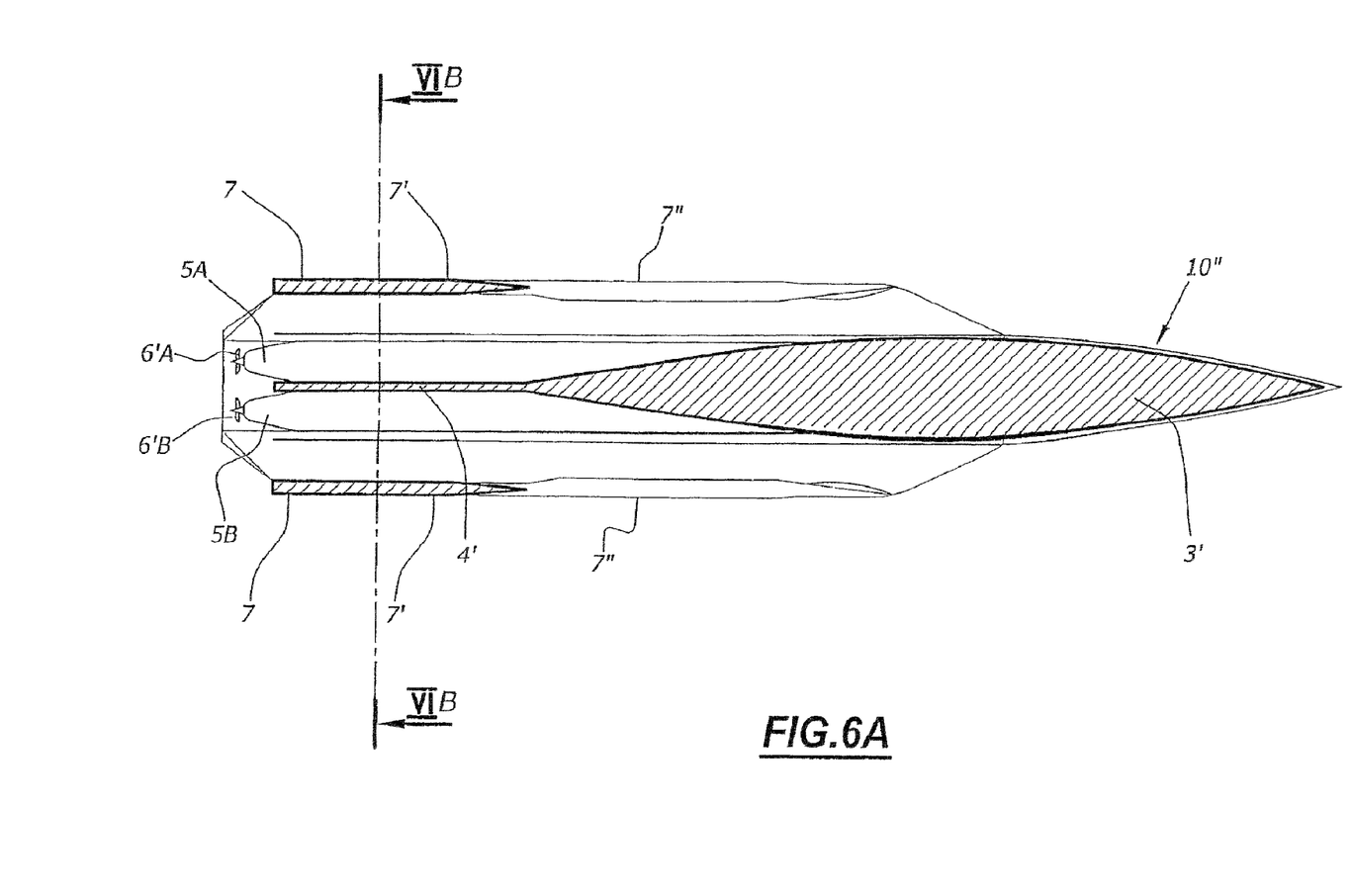
FIGS. 6A and 6B are views corresponding to sections on horizontal planes and on vertical planes of the hull of a ship of the trimaran type.
Figure 6B:
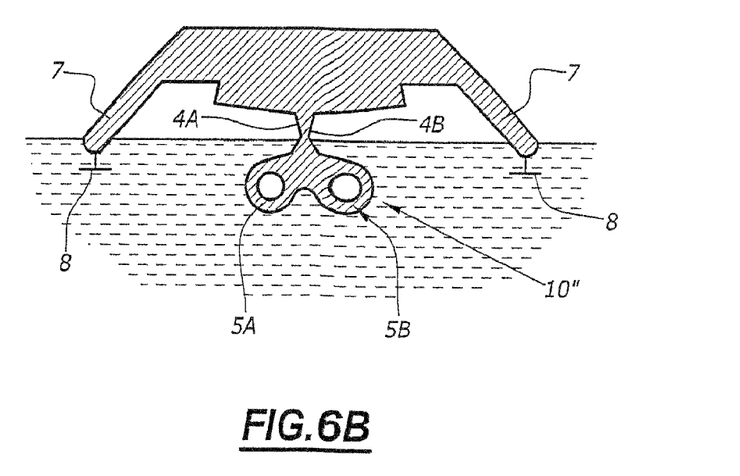

In a third variant shown in FIGS. 6A and 6B, the hulls of the trimaran type comprise a main float 10" and two side stabilizer floats 7. This hull has a waterplane having a bulbous bow portion 3" extended towards the stern by a tapering portion 4' and having two portions 7' corresponding to the immersed portions of the side stabilizer floats 7. In this variant, the lower portion of the hull has two stern bulbs 5A and 5B that are mutually parallel and that are connected to the remainder of the hull via a keel corresponding to the tapering portion 4'. Each of these bulbs carries a propulsion screw or propeller 6'A and 6'B. The two propellers can be contra-rotating, and they are driven by parallel shafts driven by distinct drive means. This configuration offers the advantage of facilitating accommodation of the contra-rotating propulsion means.

Figure 5:
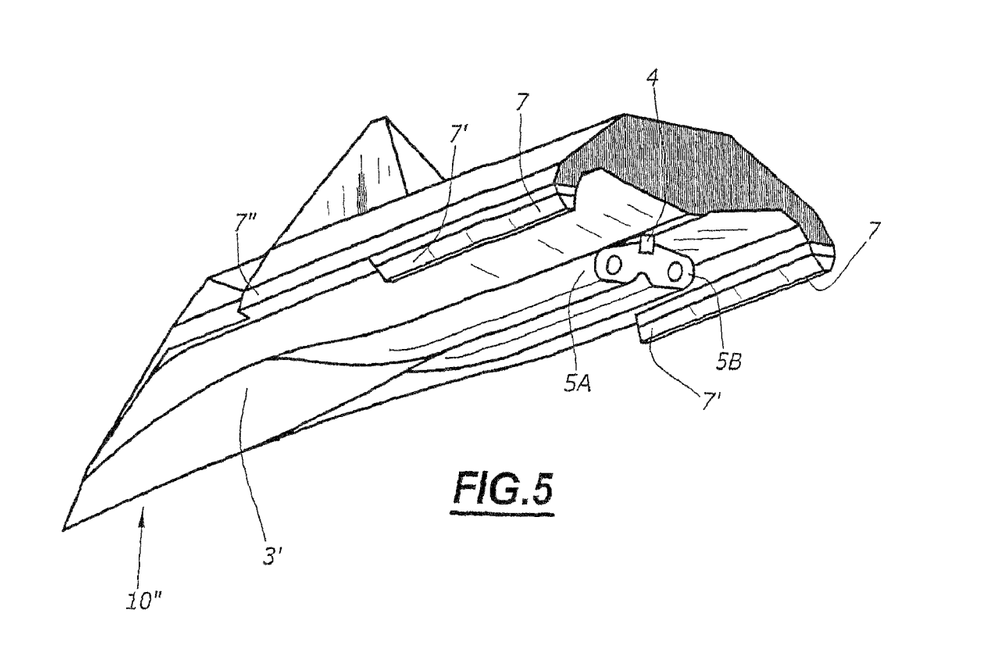
FIG. 5 is a perspective view from below of a ship hull of the trimaran type having good pitch stiffness and making it possible to receive major superstructures.

This embodiment is shown in FIG. 5 in a perspective view seen from below. This figure shows the bow portion 3' which is extended towards the stern by the two parallel bulbs 5A and 5B connected to the upper portion of the hull via the tapering keel 4, and which, on either side of the main float 10" constituted by the wide bow portion 3' and by the stern bulbs 5A and 5B, is provided with side stabilizer floats 7 constituted by keels comprising stern portions 7' extending below the waterline and bow portions 7" extending above the waterline.

Figure 7A:
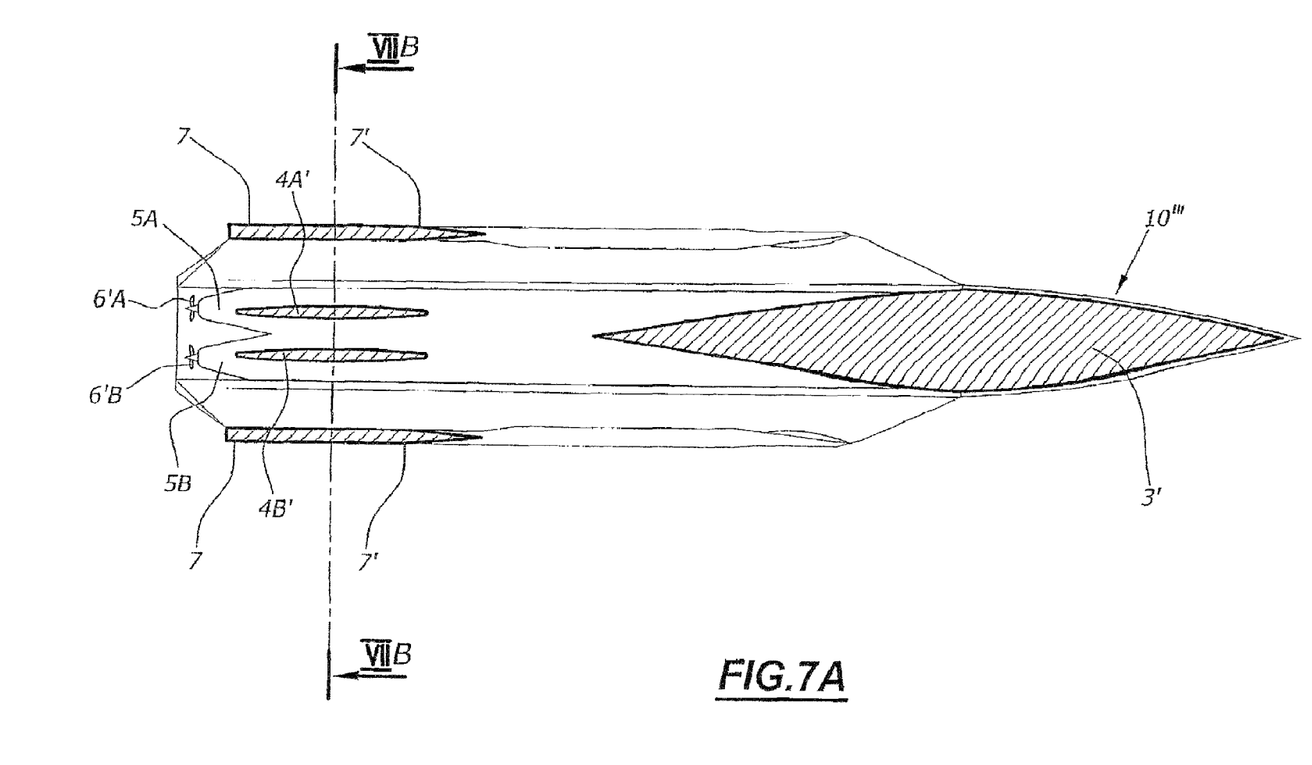
FIGS. 7A and 7B are views corresponding to sections on horizontal and vertical planes of a variant of the hull of a ship of the trimaran type.
Figure 7B:
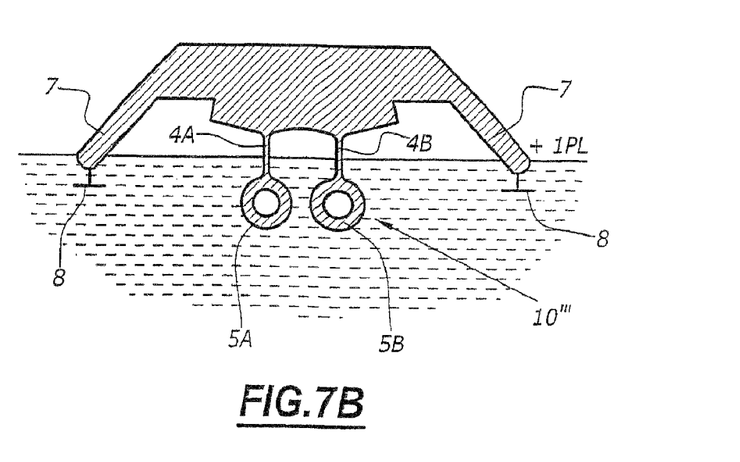
Figure 8A:
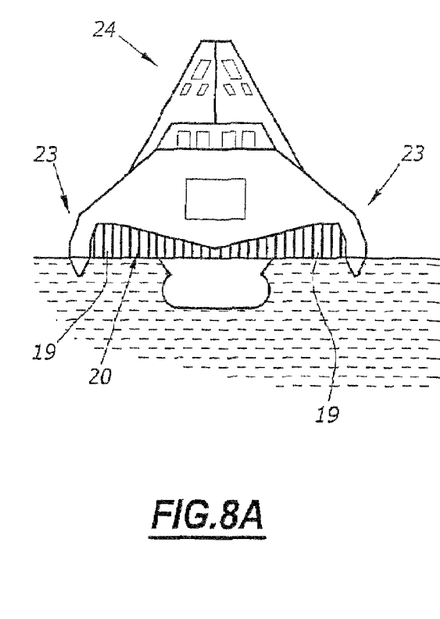
FIGS. 8A and 8B are respectively a bow view and a stern view of a ship of the trimaran type.
Figure 8B:
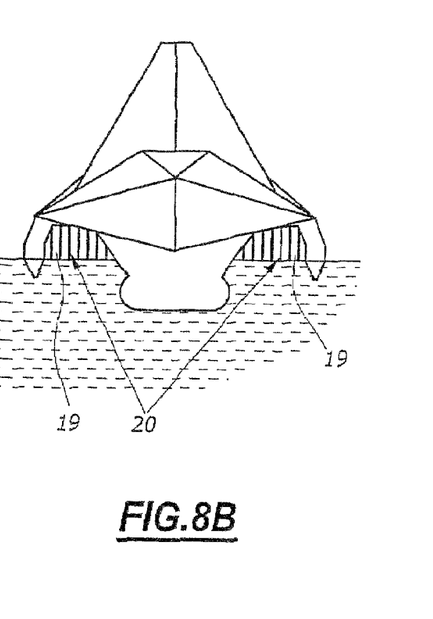

In a variant shown in FIGS. 7A and 7B, which is a hull of the trimaran type, a main float 10''' has, in its lower portion, two stern bulbs that are mutually parallel and that are connected to the upper portion of the hull by two parallel struts 4A and 4B. This configuration, which offers the same advantages as the configuration described in the preceding embodiment, also offers the advantage of reducing the drag of the ship. As can be seen in FIG. 7A, the waterplane then has a bow portion 3', thin portions 4'A and 4'B corresponding to the two struts 4A and 4B, and two portions 7' corresponding to the two side floats.

In addition to the above-described advantages, the hull structure of the trimaran-type, or more generally of the type comprising a plurality of parallel floats defining tunnels 19 between them, e.g. of the catamaran type or of the pentamaran type, offers the advantage of enabling the exhaust gases generated by energy generation means such as internal-combustion engines, diesel engines, or gas turbines, to be discharged into one of the tunnels situated between two of the floats, thereby making it possible to conceal the exhaust gases, at least partially. In addition, the tunnels can be defined by curtains of water 20 constituted by parallel, vertical jets of water extending downwards and distributed over the entire widths of the bow portions and of the stern portions of the tunnels. Said curtains of water can be formed from water drawn from the water on which the ship is floating, e.g. seawater, to which a polymer is optionally added in order to improve viscosity, and said curtains of water offer the advantage of closing the tunnels and thus of confining the exhaust gases, of making it easier for them to be cooled and to dissolve in the water. Furthermore, they constitute screens to radar waves, thereby making the ship less detectable.

Figure 9A:
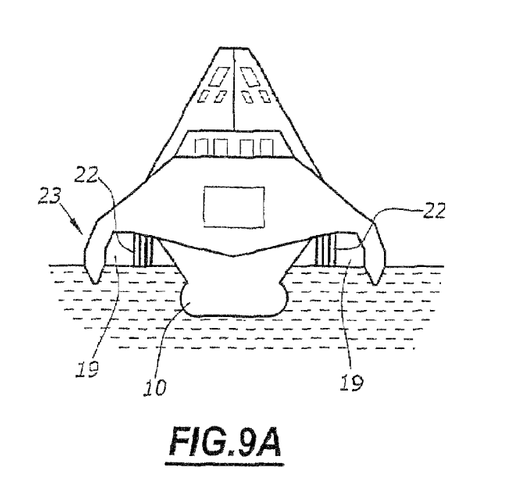
FIGS. 9A and 9B are views showing means for camouflaging the exhaust gases from the propulsion means of a trimaran.
Figure 9B:
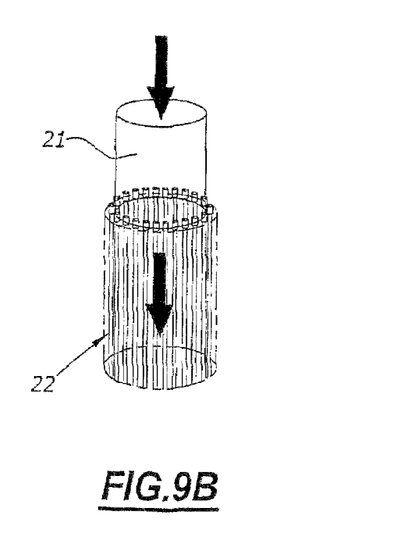

In a variant shown in FIGS. 9A and 9B, the exhaust gases are discharged into the tunnels situated on either side of the hull of the main float 10 via vertical exhaust pipes 21 whose outlets are surrounded with nozzles that generate vertical jets of water forming a cylindrical shroud 22 around each stream of gas exiting from an exhaust pipe 21.

These cylindrical shrouds 22 made up of jets of water channel the exhaust gases to the surface of the water on which the ship is floating and make it easier for them to dissolve in the water.

The above-described hulls can be made of any material, and preferably of lightweight materials such as aluminum or better still of composite materials used in shipbuilding. Such materials are, for example, composites made up of a balsa core sandwiched between at least two layers of composites made up of reinforcement fibers, e.g. glass fibers, embedded in a resin. Such materials are known per se.

In the above-described embodiments, in particular when the hull of the ship is of the trimaran type, said hull offers the advantage of having side faces (designated by overall reference 23) that are inclined upwards and inwards at large angles of inclination, e.g. at angles greater than 20°, from the waterline. Such a configuration offers the advantage of making the hull of the ship more difficult to detect with radar. As indicated above, the above-described hull of the ship makes it possible to accommodate major superstructures and to fit out the ship with major installations. An example of such fitting out of the ship is given in FIG. 11 which is a diagrammatic section view showing how fitting out a helicopter-carrying frigate is organized starting from a hull of the trimaran type that is described above.

Figure 11:
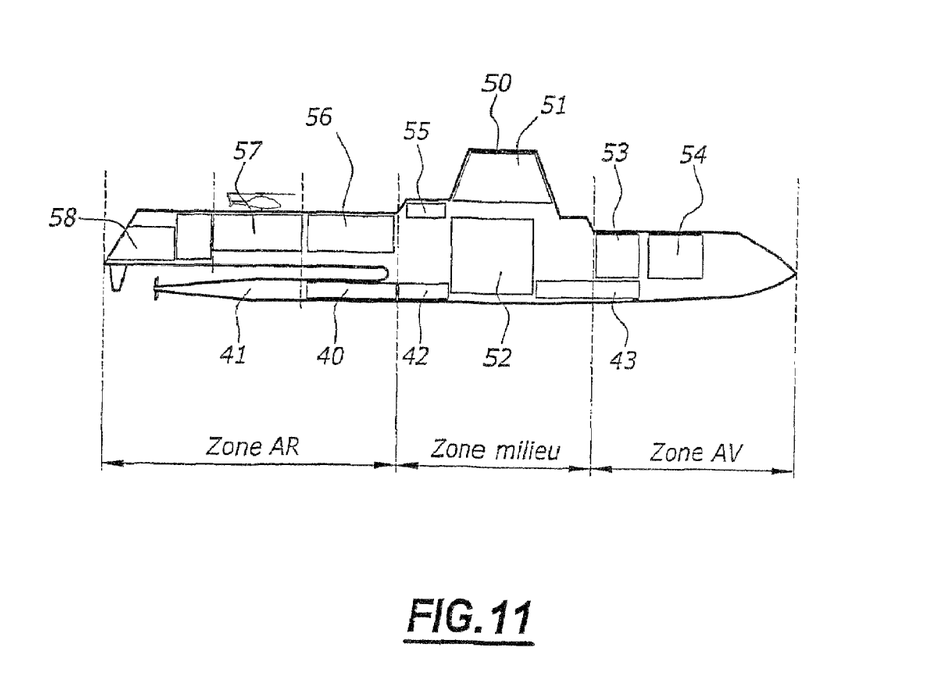
FIG. 11 is a diagrammatic section view of a ship of the trimaran type having good pitch stiffness and a high capacity for accommodating superstructures, showing a particular fitting-out configuration for the ship.

As can be seen in FIG. 11, the immersed portion, and in particular the bulb 40 is provided with propulsion means 41 in its stern portion, with storage bays 42 in its midship portion, and with other storage bays 43 in its bow portion. Above the hull, the ship carries superstructures 50 including a bridge 51 containing all of the operations control rooms and below which crew zones 52 are provided. The bridge is surmounted by a radome that contains antennae The bow portion includes an engine first compartment 53 and, further forward, a compartment 54 containing weapons that can be retracted under the general outline of the superstructures of the ship. Aft of the bridge, the ship includes weapons 55 that can be retracted under the outline of the superstructures, and, further aft, a helicopter hangar 56 and then an engine compartment 57, and, finally, bays or sheds 58 for craft that can be launched via the stern of the ship. The deck of the ship is sufficiently vast to receive an aircraft such as a helicopter.

The side faces 23 of the float(s), which side faces are situated above the waterline, are inclined upwards at angles that can be larger than 20°, and the walls 24 of the superstructures are inclined at angles that are preferably larger than 30°, thereby making the ship particularly difficult to detect with radar.

The fact that all of the items of equipment, be they weapons or antennae, which are inside the radome of the upper portion of the bridge, are camouflaged also makes the ship particularly difficult to detect.

Such a trimaran offers the advantage of being able to have all of the discharges of the exhaust gases from its energy generation engines situated in tunnels under the hull, which tunnels can be defined or confined by jets of waters, as described above. This offers the advantage of making the ship particularly difficult to detect with thermal detection means.

Figure 10:
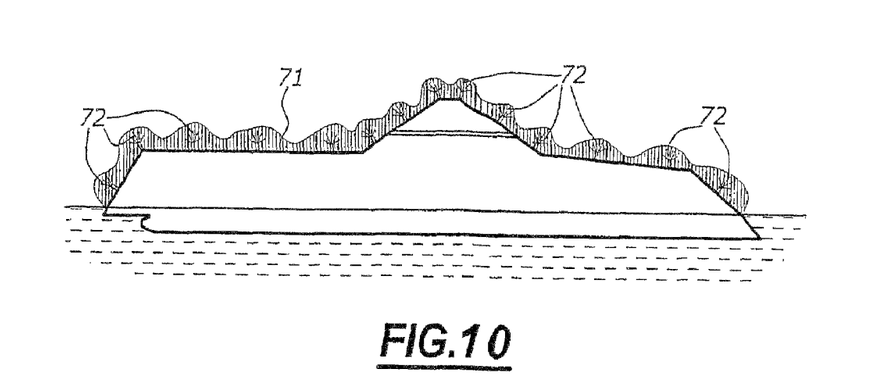
FIG. 10 is a diagrammatic profile view of a ship including camouflage means using nozzles for diffusing a mist of water.

In order to improve the stealth of the ship even further, in particular in order to make it less detectable by thermal means or visual means, the ship can be equipped with an array of nozzles 72 for generating a mist that can be used not only for fire-fighting purposes but also for generating a mist 71 that envelopes the superstructures of the ship and cools them, thereby making them less detectable by thermal detection means, less detectable by radar, and less detectable by visual detection means, in particular when the horizon is a little hazy.

Finally, since the ship is of the trimaran type, it has side floats carried by keels that extend forwards and in particular into register with the zones 52 serving to receive the crew. These side keels can be constituted partially by ballast compartments that can be filled with water, in particular in register with the living zones 52. When filled with water, such ballast compartments offer the advantage of constituting relatively effective shields against missiles, for example, or against suicide boats.

As indicated above, the above-described hull that makes it possible to form ships having both very good stability and major fitting-out capacity, can be of the single-hull type, i.e., with a single, main float, or of the catamaran type, i.e., having two main floats that are mutually parallel and that define a tunnel between them, or indeed of the type having any other multi-hull combination, i.e., having a central main float supplemented by one or more pairs of side stabilizer floats.

Such a hull can be used to form a naval ship, but it can also be used to form commercial ships, such as, for example, ships for carrying passengers. The ships formed can be of any size, and, for example, have tonnages of the order of 7000 metric tonnes.

The invention claimed is:

1. A ship hull comprising; at least one float, wherein the center of buoyancy of the hull is aft of the center of flotation of the hull, and the distance between the center of buoyancy and the center of flotation is greater than 0.05 times the length of the waterline of the hull, and further comprising:
    at least one main float,
    the at least one main float having a waterplane comprised of a wide bow portion and a tapering stern portion so that the corresponding center of flotation is situated in the bow portion of the waterplane, and
    the at least one main float having an immersed portion with a tapering bow and at least one stern bulb,
    wherein the center of buoyancy of the main float is situated in register with the stern portion of the waterplane, and
    wherein the immersed portion of the at least one main float includes two stern bulbs that are mutually parallel.

2. A ship including a hull, wherein the center of buoyancy of the hull is aft of the center of flotation of the hull, and the distance between the center of buoyancy and the center of flotation is greater than 0.05 times the length of the waterline of the hull, and with the hull comprising at least two floats that are mutually parallel and that define a tunnel, and including at least one energy generation means that gives off an exhaust gas, and wherein said exhaust gas is discharged into the tunnel defined by the two floats, and wherein said exhaust gas is at least partially confined in said tunnel by at least one curtain of water or by a sleeve made up of vertical jets of water.

* * * * *